(12) United States Patent
Aitidis

(10) Patent No.: US 12,065,137 B2
(45) Date of Patent: Aug. 20, 2024

(54) PROXIMITY SENSING SYSTEMS AND THEIR CONTROL

(71) Applicant: Jaguar Land Rover Limited, Coventry (GB)

(72) Inventor: Ilias Aitidis, Coventry (GB)

(73) Assignee: Jaguar Land Rover Limited, Coventry (GB)

(*) Notice: Subject to any disclaimer, the term of this patent is extended or adjusted under 35 U.S.C. 154(b) by 115 days.

(21) Appl. No.: 16/612,623

(22) PCT Filed: Jul. 11, 2018

(86) PCT No.: PCT/EP2018/068744
§ 371 (c)(1),
(2) Date: Nov. 11, 2019

(87) PCT Pub. No.: WO2019/020369
PCT Pub. Date: Jan. 31, 2019

(65) Prior Publication Data
US 2020/0198630 A1 Jun. 25, 2020

(30) Foreign Application Priority Data
Jul. 26, 2017 (GB) ..................... 1712004

(51) Int. Cl.
*B60W 30/06* (2006.01)
*B60W 30/095* (2012.01)
(Continued)

(52) U.S. Cl.
CPC ........ *B60W 30/0953* (2013.01); *B60W 50/14* (2013.01); *G05D 1/0212* (2013.01);
(Continued)

(58) Field of Classification Search
CPC .. G05D 1/0212; G05D 1/0214; G05D 1/0217; G05D 1/0219; G05D 1/0221;
(Continued)

(56) References Cited

U.S. PATENT DOCUMENTS

2008/0024284 A1 1/2008 Baratoff et al.
2010/0274446 A1* 10/2010 Sasajima ................ G08G 1/168
701/36

(Continued)

FOREIGN PATENT DOCUMENTS

DE 103 10 655 A1 9/2004
DE 10 2005 039 525 A1 2/2007
(Continued)

OTHER PUBLICATIONS

Patents Act 1977: Combined Search and Examination Report under Sections 17 and 18(3), UKIPO Application No. GB1712004.9, Jan. 11, 2018, 9 pp.
(Continued)

*Primary Examiner* — Ian Jen
*Assistant Examiner* — Hossam M Abd El Latif
(74) *Attorney, Agent, or Firm* — Reising Ethington P.C.

(57) ABSTRACT

Embodiments of the present invention provide a controller. The controller comprises an input means (22) for receiving a trajectory parameter signal comprising one or more parameters indicative of the trajectory (32, 38) of a vehicle (30). The controller further comprises a processing means arranged to set, in dependence on the one or more parameters, a distance from the trajectory for a boundary of an alert zone (40, 44), where the alert zone boundary is, in use, determinative of the minimum distance from the trajectory (32, 38) below which a detected object will trigger an alert.

15 Claims, 2 Drawing Sheets

(51) Int. Cl.
    *B60W 50/14*     (2020.01)
    *B62D 15/02*     (2006.01)
    *G05D 1/00*     (2024.01)
    *G08G 1/16*     (2006.01)

(52) U.S. Cl.
    CPC ....... *G08G 1/166* (2013.01); *B60W 2050/143* (2013.01); *B60W 2540/18* (2013.01); *B60W 2554/4041* (2020.02)

(58) Field of Classification Search
    CPC . G05D 1/0223; G05D 1/0225; B60W 30/095; B60W 30/0953; B60W 30/0956; B60W 50/14; B60W 2050/143; B60W 2050/146; B60W 50/16
    USPC ......................................................... 701/301
    See application file for complete search history.

(56) References Cited

U.S. PATENT DOCUMENTS

| | | | |
|---|---|---|---|
| 2011/0288727 A1* | 11/2011 | Krautter ............... | B62D 15/027 701/1 |
| 2012/0065877 A1 | 3/2012 | Jecker et al. | |
| 2012/0262284 A1 | 10/2012 | Irrgang et al. | |
| 2013/0033371 A1* | 2/2013 | Schliemann ........... | G08G 1/165 340/435 |
| 2013/0335553 A1* | 12/2013 | Heger .................... | B60Q 9/008 348/118 |
| 2015/0213718 A1 | 7/2015 | Ono | |
| 2015/0371542 A1 | 12/2015 | Fujishiro | |
| 2016/0257304 A1* | 9/2016 | Lavoie .................. | B60W 10/04 |
| 2017/0137061 A1* | 5/2017 | Azuma ............... | B62D 15/0285 |
| 2017/0169703 A1* | 6/2017 | Carrasco ............... | B60Q 5/006 |
| 2017/0263127 A1* | 9/2017 | Auden .................. | G08G 1/166 |
| 2019/0212439 A1* | 7/2019 | Nohl ................... | B60T 8/17558 |

FOREIGN PATENT DOCUMENTS

| | | | | |
|---|---|---|---|---|
| DE | 102005039525 A1 | * | 2/2007 | .......... B60W 40/072 |
| DE | 10 2006 002 744 A1 | | 8/2007 | |
| DE | 10 2009 047 066 A1 | | 5/2011 | |
| DE | 10 2010 045 694 A1 | | 3/2012 | |
| DE | 10 2011 113 325 A1 | | 3/2012 | |
| DE | 10 2012 010 130 A1 | | 12/2012 | |
| DE | 10 2014 004 739 A1 | | 9/2014 | |
| DE | 10 2014 018 620 A1 | | 6/2016 | |
| EP | 1470967 B1 | | 2/2011 | |
| EP | 2 816 539 A1 | | 12/2014 | |
| EP | 2 887 335 A1 | | 6/2015 | |
| FR | 3 012 784 A1 | | 5/2015 | |
| JP | 2003285705 A | | 10/2003 | |
| JP | 2013511755 A | | 4/2013 | |
| JP | 2018-77612 A | | 5/2018 | |
| WO | 2013/159954 A1 | | 10/2013 | |
| WO | 2018/010742 A1 | | 1/2018 | |

OTHER PUBLICATIONS

Patents Act 1977: Combined Search and Examination Report under Sections 17 and 18(3), UKIPO Application No. GB1811326.6, Dec. 20, 2018, 7 pp.

International Search Report and Written Opinion of the International Searching Authority, International Application No. PCT/EP2018/068744, Oct. 26, 2018, 12 pp.

Chinese Office Action and machine translation corresponding to Chinese Application No. 201880036515.3, dated Dec. 16, 2022, 11 pages.

European Office Action corresponding to European Application No. 18 742 966.7, dated Dec. 6, 2022, 5 pages.

English language summary of Japanese Office Action corresponding to Japanese Application No. 2020-503852, dated Jan. 17, 2023, 1 page.

Chinese Office Action corresponding to Chinese Application No. 201880036515.3 dated May 5, 2022, 16 pages.

Japanese Office Action with English summary corresponding to application 2023-080849, dated Feb. 27, 2024, 6 pages.

* cited by examiner

PROXIMITY SENSING SYSTEMS AND THEIR CONTROL

RELATED APPLICATIONS

This application is a 35 U.S.C. § 371 national stage application of PCT Application No. PCT/EP2018/068744, filed on Jul. 11, 2018, which claims priority from Great Britain Patent Application No. 1712004.9 filed on Jul. 26, 2017, the contents of which are incorporated herein by reference in their entireties. The above-referenced PCT International Application was published in the English language as International Publication No. WO 2019/020369 A1 on Jan. 31, 2019.

TECHNICAL FIELD

The present disclosure relates to proximity sensing systems and their control. Aspects of the invention relate a controller, a system, a vehicle and a method as claimed in the appended claims.

BACKGROUND

Some existing proximity sensing systems (such as park assist systems) determine a trajectory of a vehicle based on steering angle, and output an alert to a user if it is determined that an obstacle lies within a threshold distance of the trajectory. The margin provided by the threshold distance may mitigate against some detection inaccuracies and/or "blind spots" which might otherwise result in a failure to alert or delayed alert. A blind-spot might for example exist in an area alongside a vehicle where no proximity sensors are positioned.

Such systems can however remain subject to a failure to alert or a delay in the issuing of alert before a collision occurs. Particularly in cases where the vehicle is turning, the accuracy of a trajectory estimation may be compromised. Further particularly in cases where the vehicle is turning, detection of an object and/or determination that its presence warrants an alert in a manner that is timely may be compromised. For instance it may be that during a reversing and turning manoeuvre, an object on the outside of the turn detected by a forward side sensor may be determined to be outside of the threshold distance given the trajectory of the turning vehicle. Nonetheless it may be that the object extends for a significant distance rearward beyond what can be sensed by the forward side sensor. This extent may be sufficient such that the trajectory and the object will in fact coincide if the trajectory is maintained unadjusted.

Even were it possible to significantly improve the accuracy of trajectory estimation and to significantly improve object detection and alert determination, vehicle users may still feel unable to rely on the system (completely or otherwise). A user may for instance be unsure as to the accuracy and any fallibilities of the system. A user's confidence may be further reduced during particular manoeuvres (e.g. turns), not least because their own ability to predict the trajectory/extent of the vehicle may be somewhat impaired in these circumstances.

It is an object of embodiments of the invention to at least mitigate one or more of the problems of the prior art.

SUMMARY OF THE INVENTION

Aspects and embodiments of the invention provide a controller, a system, a vehicle and a method as claimed in the appended claims.

According to an aspect of the invention there is provided a controller comprising:
processing means arranged to set, in dependence on one or more parameters, a distance, from the trajectory for a boundary of an alert zone, where the alert zone boundary is, in use, determinative of the minimum distance from the trajectory below which a detected object will trigger an alert.

According to an aspect of the invention there is provided a controller comprising:
input means for receiving a trajectory parameter signal comprising one or more parameters indicative of a trajectory of a vehicle; and
processing means arranged to set, in dependence on the one or more parameters, a distance from the trajectory for a boundary of an alert zone, where the alert zone boundary is, in use, determinative of the minimum distance from the trajectory below which a detected object will trigger an alert.

As will be appreciated the controller may have an output means for outputting a distance determining signal in accordance with the distance determined by the processing means. This distance determining signal may then be used in combination with trajectory data and proximity sensing data indicative of objects in the vicinity of the vehicle by a separate controller to selectively issue alerts concerning objects to a user of the vehicle. Alternatively the controller itself may have a proximity sensing data input, and may selectively issue alerts to a user of the vehicle via an alert signal output, the alerts being issued in accordance with the proximity sensing data received, the parameters indicative of the trajectory and the determined distance.

As will be further appreciated, the trajectory parameter signal may comprise a trajectory of the vehicle calculated by another processing means or one or more parameters material to determining the vehicle trajectory. In the latter case the processing means may calculate a trajectory for the vehicle in dependence on the parameter(s) contained in the trajectory parameter signal and determine the distance based on this trajectory or may calculate the distance in dependence on the parameter(s) contained in the trajectory parameter signal.

It may be that the confidence in a trajectory that is being followed by a vehicle (be it as calculated by a processing means based on sensed data or estimated by a user) may vary in dependence on the nature of that trajectory. By way of example a processing means and/or a user may be able to more accurately determine the trajectory of a vehicle where it is travelling in a straight line and/or in a direction in which a user is facing. Where however a vehicle is moving in a curve or with a travel direction component at an angle to the direction in which a user is facing, there may be greater uncertainty in vehicle trajectory estimation in the mind of the user and/or in accordance with the calculations of a processing means. Thus by linking the distance from the trajectory at which a detected object would trigger an alert with the particular trajectory on which the vehicle appears to be, the confidence of a user may be increased. Further the likelihood of a collision and/or the incidence of false positive alerts may be reduced.

In some embodiments the trajectory is an area between parallel tracks which project an area predicted to be occupied by the vehicle. The alert zone boundary may be located beyond the extremities of the area predicted to be occupied by the vehicle. The alert zone boundary may be parallel to the trajectory. In particular, at any instant in time, the alert zone boundary may be parallel to the trajectory.

In some embodiments the controller is a proximity sensing system controller.

In some embodiments the controller comprises an output means arranged to output an alert signal in dependence on a determination that the vehicle reaches a position along the trajectory at a predefined distance from a point on the trajectory associated with the detected position of an object within the alert zone boundary. In this way, whether or not an alert is issued can depend on the apparent trajectory of the vehicle itself, the alert zone boundary distance from that trajectory that is determined and the distance of the object from the vehicle.

In some embodiments the point on the trajectory is on an imaginary line which is both perpendicular to the trajectory and passes through the object.

In some embodiments the processing means is configured to determine the point on the trajectory associated with a given detected position of the object similarly for all detected objects within the alert zone boundary. It may be for instance that the point on the trajectory is provided on a line perpendicular to the trajectory and passing through the object.

In some embodiments the processing means is arranged to determine the distance for the alert zone boundary such that a different distance is determined for at least two different vehicle trajectories.

In some embodiments the processing means is arranged to determine the distance in dependence on the radius of curvature of the trajectory.

In some embodiments the one or more parameters indicative of the trajectory of a vehicle comprise a parameter or parameters indicative of an operational state of a vehicle trajectory control means. The vehicle trajectory control means could be any suitable control interface.

In some embodiments the vehicle trajectory control means comprises a steering wheel. Additionally or alternatively the one or more parameters indicative of the trajectory of a vehicle comprise a parameter or parameters indicative of the configuration of other vehicle trajectory determining components (e.g. the orientation of one or more steerable wheels or the operation of one or more continuous tracks of the vehicle). In some embodiments the one or more parameters indicative of the trajectory of a vehicle comprise a parameter or parameters indicative of other factors e.g. vehicle gear selection (e.g. forward or reverse), the terrain type and/or condition and/or the vehicle's speed, weight, yaw, pitch and/or roll.

In some embodiments the processing means is arranged to set the distance for the alert zone boundary in dependence on a rate of change in of the trajectory of the vehicle.

In some embodiments the processing means is arranged to increase the distance for at least part of the vehicle where the one or more parameters indicative of the trajectory of the vehicle indicate increased deviation from a particular predefined trajectory. As the trajectory of the vehicle deviates further from a particular predefined trajectory, uncertainty with regard to the actual trajectory may increase (be it as calculated or as estimated in the mind of a user). Therefore it may be appropriate to increase the distance from the apparent trajectory at which an object would trigger an alert at least for parts of the vehicle deemed to be at greater risk of collision. It may be for instance that deviation from a straight line trajectory may increase uncertainty. Even a straight line trajectory may increase uncertainty where such a trajectory is different from a straight line trajectory in a direction in which an operator of the vehicle conventionally faces. Such straight line trajectories could for instance occur where four or all wheel steer facilitates vehicle travel in a straight line at an angle to a main forward to rear axis of the vehicle.

In some embodiments the predefined trajectory is a straight line trajectory and/or a straight line trajectory in a direction in which an operator of the vehicle would conventionally face.

In some embodiments the processing means is arranged to increase the distance for at least part of the vehicle where the one or more parameters indicative of the trajectory of the vehicle indicate a decrease in radius of curvature of a turn. This may be advantageous where a decrease in the radius of curvature of the turn results in increased uncertainty with regard to trajectory.

In some embodiments the processing means is arranged to determine different distances at different locations around the vehicle for a given parameter or parameters indicative of the trajectory of the vehicle. This may be advantageous where adjustment to the trajectory alters the risk of collision to different parts of the vehicle by different amounts. This may allow the distance to be tailored at different points around the vehicle in dependence on the magnitude of collision risk at those different points in accordance with the particular prevailing trajectory. This may allow greater protection for parts of the vehicle at greater risk and/or reduction in the incidence of false positive alerts in other areas.

In some embodiments where the processing means is arranged to increase the distance on a side of the vehicle on the outside of a turn where the one or more parameters indicative of the trajectory of the vehicle indicate a trajectory of a decreased radius of curvature. Parts of the vehicle on the outside of the turn may be at increased risk of collision as a result of the decrease in radius of curvature. This may be because objects which are further from the vehicle will nonetheless intersect its path on its side to the outside of the turn than would otherwise have been the case. Further the increased rate of turn may decrease the accuracy with which the trajectory can be estimated. Thus increasing the distance on this side of the vehicle may decrease the likelihood of a collision.

In some embodiments where the processing means is arranged to increase the distance on a side of the vehicle on the inside of a turn when the one or more parameters indicative of the trajectory of the vehicle indicate a trajectory of a decreased radius of curvature. Whilst the decrease in radius of turn may increase the risk of collision more for the side of the vehicle on the outside of a turn than the inside, the inside may nonetheless still be at increased risk of collision. Thus increasing the distance on this side of the vehicle may decrease the likelihood of collision.

In some embodiments the distance increase to the side of the vehicle on the outside of the turn is greater than the distance increase to the side of the vehicle on the inside of the turn. This difference may allow for better reflection of the relative risks of collision to the different sides of the vehicle arising in view of the decrease in radius of turn. In this way the risk of collision and risk of false positive alerts may be tailored to the specific side of the vehicle given the nature of the turn.

In some embodiments the processing means is arranged to determine the distance with respect to a nominal distance.

In some embodiments the nominal distance is the same for both sides of the vehicle. This may be appropriate where trajectory change options and extents are the same to both sides of the vehicle.

In some embodiments the processing means is arranged so that a distance adjustment it makes in accordance with an adjustment to the trajectory as indicated by the one or more parameters is reversed in accordance with an equal and opposite adjustment to the trajectory as indicated by the one or more parameters. In this way a consistent distance may be generated by the processing means in response to a particular trajectory of the vehicle.

Is some embodiments the processing means is arranged so that it adjusts the distance continuously for at least a range of trajectory adjustments as indicated by the one or more parameters. Thus a range of trajectories may be associated with a corresponding range of unique distance determinations.

In some embodiments the vehicle is a land vehicle. The vehicle may for instance be a motorbike, car, van, lorry, HGV, bus or vehicles used in a specific sector such as agriculture, construction or the military.

In some embodiments said input means comprises an electrical input and said processing means comprises an electronic processor.

In some embodiments said output means comprises an electrical output.

In some embodiments the objects are detected by a proximity sensing means. The proximity sensing means may comprise one or more proximity sensors. The sensors may for instance be ultrasonic, radar, infrared and/or optical, for example.

According to another aspect of the invention there is provided a system comprising a proximity sensing means and a controller according to the previous aspect.

In some embodiments the system comprises one or more parameter sensors arranged to sense the one or more parameters indicative of the trajectory of the vehicle.

In some embodiments the system comprises one or more vehicle operator alert interfaces. The alert interface may be arranged to communicate an alert by any suitable means (e.g. auditory, visual or haptic).

According to a further aspect of the invention there is provided a vehicle comprising a controller according to the previous controller aspect or a system according to the previous system aspect.

According to still further aspect of the invention there is provided a method of setting a distance for a boundary of an alert zone from a trajectory of a vehicle, the method comprising:
receiving a trajectory parameter signal comprising one or more parameters indicative of the trajectory of the vehicle; and
setting, in dependence on the one or more parameters, a distance from the trajectory for a boundary of an alert zone where the alert zone boundary is, in use, determinative of the minimum distance from the trajectory below which a detected object will trigger an alert.

In some embodiments the method comprises determining the distance for the alert zone boundary such that a different distance is determined for at least two different vehicle trajectories.

In some embodiments the method comprises determining the distance in dependence on the radius of curvature of the trajectory.

In some embodiments the method comprises determining different distances at different locations around the vehicle for a given parameter or parameters indicative of the trajectory of the vehicle.

In some embodiments the method comprises increasing the distance on a side of the vehicle on the outside of a turn where the one or more parameters indicative of the trajectory of the vehicle indicate a trajectory of a decreased radius of curvature.

In some embodiments the method comprises increasing the distance on a side of the vehicle on the inside of a turn when the one or more parameters indicative of the trajectory of the vehicle indicate a trajectory of a decreased radius of curvature.

According to a still further aspect of the invention there is provided a computer program that, when executed by a processor, causes performance of the method described above.

According to a still further aspect of the invention there is provided a non-transitory computer readable storage medium comprising computer readable instructions that, when executed by a processor, causes performance of the method described above.

According to a still further aspect of the invention there is provided a signal comprising computer readable instructions that, when executed by a processor, causes performance of the method as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
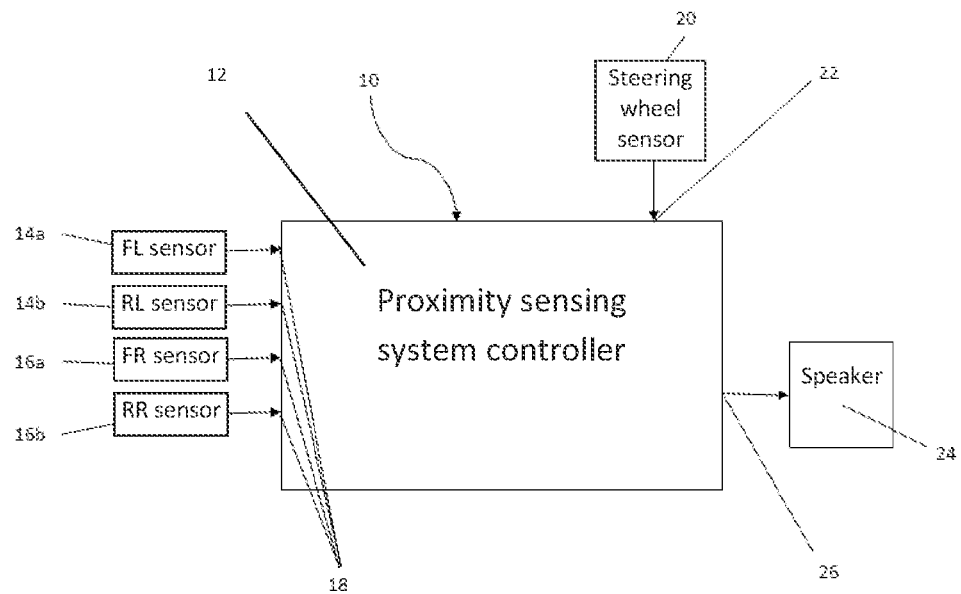
FIG. 1 shows a schematic view of a proximity sensing system according to an embodiment of the invention.

Referring first to FIG. 1, a proximity sensing system is generally shown at 10. In this case the proximity sensing system is installed in a vehicle and specifically a car. Nonetheless it will be appreciated that the system might alternatively be deployed in another vehicle type.

The proximity sensing system 10 comprises a proximity sensing system controller 12. The controller 12 comprises a processor (not shown) and a memory (not shown) with which the processor communicates. The memory stores a computer program comprising computer readable instructions that, when read by the processor, cause performance of the methods described herein. The computer program may be software or firmware, or may be a combination of software and firmware.

The system 10 further comprises an array of proximity sensors: forward 14a and rearward 14b left side sensors and forward 16a and rearward 16b right side sensors. In the embodiment of FIG. 1, the proximity sensors are ultrasonic sensors, though in other embodiments alternative and/or additional sensor types could be used (e.g. radar, infrared or optical). It will be appreciated that in other embodiments, additional proximity sensors may be provided, but in the present embodiment only the sensors 14a, 14b, 16a and 16b are provided with a view to simplifying explanation. In the embodiment of FIG. 1, each proximity sensor outputs a corresponding proximity sensing data signal to a respective input 18 of the controller 12. The proximity sensing data indicates the proximity of any object detected by the relevant proximity sensor. The proximity sensing data is stored in the memory for retrieval and use by the processor.

The system 10 also has a parameter sensor (in this case a steering wheel sensor 20) arranged to measure a parameter indicative of the trajectory of the vehicle (in this case the rotational state of a steering wheel of the vehicle). The steering wheel sensor 20 outputs a trajectory parameter signal (in this case a steering wheel rotation data signal) to an input 22 of the controller 12. The steering wheel data indicates the angle of one or more vehicle wheels as requested at any given time in accordance with control of the steering wheel. The steering wheel rotation data is stored in the memory for retrieval and use by the processor. As will be appreciated, additional and/or alternative trajectory parameter signals could be generated and input to the controller 12 by different parameter sensors measuring alternative parameters indicative of the trajectory of the vehicle.

The system 10 further comprises a vehicle operator alert interface (in this case a speaker 24). The speaker 24 is driven by an alert signal selectively sent by the processor via an alert signal output 26 of the controller 12.

Figure 2A:
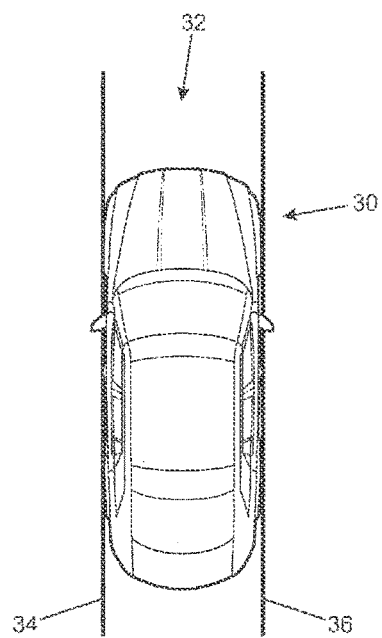
FIG. 2*a* shows a vehicle and its straight line trajectory.
Figure 2B:
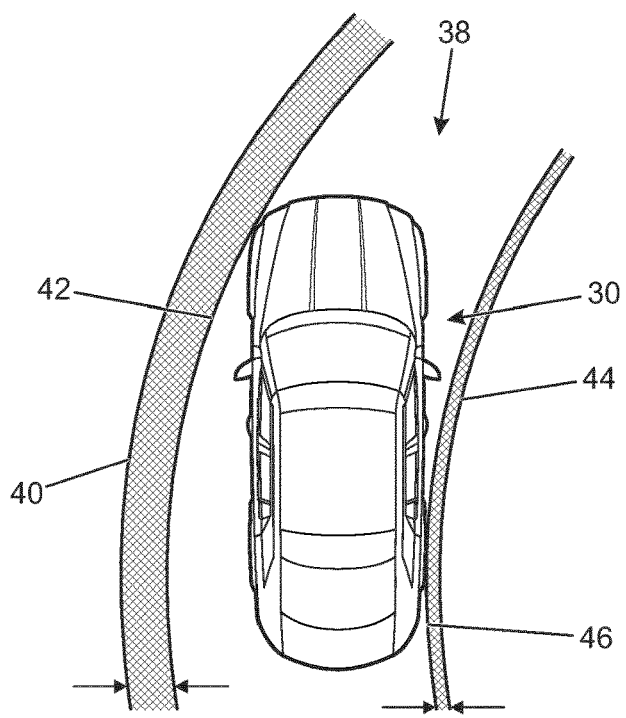
FIG. 2*b* shows a vehicle and its curved trajectory together with projections of alert zones for a forward left side proximity sensing and a rearward right side proximity sensing.
Figure 3:
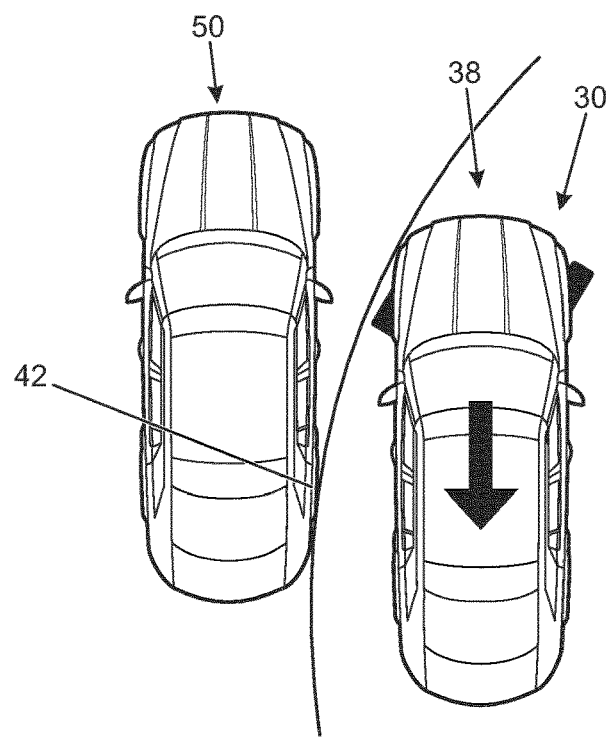
FIG. 3 shows a vehicle reversing and turning manoeuvre performed proximate an object to one side of the vehicle.

The functioning of the system 10 is now described with further reference to FIGS. 2a, 2b and 3.

Referring to FIG. 2a, a vehicle is shown at 30. The vehicle 30 is in motion travelling in a reverse direction and following a straight line trajectory 32. In general the trajectory 32 corresponds to the area between parallel tracks, one aligned with each side extremity, or an offset from the side extremity, of the vehicle 30, which project the path of the vehicle 30 based on the assumption that control inputs and/or other factors affecting trajectory are maintained in their prevailing state. The trajectory could therefore be a straight path or a path having a particular radius of curvature. In the case of FIG. 2a the trajectory 32 is shown as a straight line and is aligned with a direction in which an operator of the vehicle 30 conventionally faces. This trajectory 32 arises principally from steering wheel control by the operator in a manner which aligns the steering wheels of the vehicle 30 (in this case a pair of front wheels) with the direction in which the operator conventionally faces.

Based on steering wheel rotation data retrieved from the memory, the processor determines that the vehicle 30 is following the straight line trajectory 32. Also based on the steering wheel rotation data, the processor sets an alert zone boundary (not shown) to either side (nearside 34 and offside 36 assuming the vehicle is configured for left-hand traffic) of the straight line trajectory 32. The alert zone boundaries define respective alert zones between the alert zone boundary and the adjacent side of the trajectory. In view of the trajectory 32 being a straight line, the alert zone boundaries are set as the same for both sides 34, 36 of the trajectory 32 at what may be considered a nominal distance from that respective side 34, 36 of the trajectory.

Thereafter one or more of the proximity sensors 14a, 14b, 16a, 16b may detect an object at or inside one of the alert zone boundaries. Information concerning the location of such an object is transmitted via the respective proximity sensor 14a, 14b, 16a, 16b in a proximity sensing data signal. The processor uses this information to determine whether the vehicle 30 is within a predefined distance of a point within the trajectory 32 associated with the detected position of the object within the alert zone boundary. In the present embodiment, the point within the trajectory 32 is on an imaginary line which is both perpendicular to the trajectory 32 and passing through the object. In alternative embodiments however the location of the point may be determined in another manner. Where the vehicle is within a predefined distance of the point, the processor generates an alert signal and transmits it to the speaker 24 via the alert signal output 26. The speaker 24 is positioned within a cabin of the vehicle 30 and so may alert the operator of the vehicle 30 to the presence of the object. As will be appreciated, one or more additional alerts, each distinguishable in character from the others, may be created in a similar manner but for various shorter predefined distances. Thus the alert may for instance be intensified as the object is progressively approached.

Referring now to FIG. 2b, the effect of a change in steering wheel control by the operator in a manner so as to alter the trajectory of the vehicle 30 can be seen. The change in steering wheel control is a turn to the right away from the straight line trajectory. Based on steering wheel rotation data retrieved from the memory, the processor determines that the vehicle 30 is following the particular curved trajectory 38. Also based on the steering wheel rotation data, the processor sets a left side alert zone boundary 40 adjacent to a left side 42 of the trajectory 38 and a right side alert zone boundary 44 adjacent to a right side 46 of the trajectory 38. The distance of the left side alert zone boundary 40 from the left side 42 of the trajectory and the distance of the right side alert zone boundary 44 from the right side 46 of the trajectory 38 are different. Specifically the left side alert zone boundary 40 is wider than the right side alert zone boundary 44 (i.e. it is at a greater distance from the left side 42 of the trajectory 38 than the right side alert zone boundary 44 is from the right side 46 of the trajectory 38). Despite this the distance of the left side alert zone boundary 40 from the left side 42 of the trajectory 38 and the distance of the right side alert zone boundary 44 from the right side 46 of the trajectory 38 are both greater than the nominal distance. The left side alert zone boundary 40 is on the outside of the turn created by the steering wheel control, and the right side alert zone boundary 44 is on the inside of the turn.

In the present embodiment the setting of the distance of the left side and right side alert zone boundaries by the processor is undertaken such that they change in a continuous manner as the steering wheel control is varied. Specifically and with respect to the nominal distance, the width of an alert zone on both the inside and outside of a turn increases with reduced radius of curvature of the turn, but the width of the alert zone on the outside of the turn increases by more than the increase in the width of the alert zone on the inside of the turn. The straight line trajectory 32 may be considered a predefined trajectory at which the width of both alert zones is the same. Furthermore a distance adjustment made by the processor in accordance with an adjustment to the trajectory as indicated by the steering wheel rotation data, is reversed in accordance with an equal and opposite adjustment to the trajectory as indicated by the steering wheel data.

Referring now to FIG. 3, a possible advantage of the embodiment of FIGS. 1, 2a and 2b is described. In FIG. 3 the curved trajectory 38 of FIG. 2b is repeated, with the vehicle 30 again reversing. Also shown is an object, in this case another vehicle 50. The other vehicle 50 is to the left hand side (i.e. adjacent the outside of the turn) of the vehicle 30. As can be seen, the left side 42 of the curved trajectory 38 passes very nearby to the other vehicle 50, and indeed would result in a glancing collision if continued. A number of factors may also make collision more likely given the particular trajectory and position of the other vehicle 50 as described. First it may be that the other vehicle is at least partially outside of the vehicle 30 operator's view in the vehicle 30 mirrors. The position of the other vehicle may also mean that its full relevant extent is not detectable by the left side proximity sensors 14a, 14b at least until the vehicles 30, 50 are unacceptably close to collision. Specifically the vehicle 50 may not extend sufficiently for the left side rear proximity sensor 14b to assist in its detection and any size determination of the vehicle 50. Thus detection may be based only on signals from the forward left side proximity sensor 14a, which may not be able to detect the full relevant extent of the vehicle 50. Thus the processor may determine that the vehicle 30 trajectory overlaps the other vehicle 50 only relatively late if at all. As will be appreciated these difficulties may increase as the radius of curvature decreases.

Thus the embodiment described with respect to FIGS. 1, 2a and 2b, may decrease the likelihood of a collision by increasing the margin for error (i.e. the width of the alert zone) as the radius of curvature decreases. An operator who may themselves be less able to judge accurately the trajectory and/or extent of the vehicle 30 as the radius of curvature decreases, may also be given greater confidence by evidence of a greater margin for error in terms of reaction time to an alert. As will be appreciated the system also has the potential to reduce the incidence of false positive alerts by matching the width of a particular alert zone to the risk of collision to a specific area of the vehicle in accordance with a specific trajectory.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A controller comprising:
an input for receiving a trajectory parameter signal comprising one or more parameters indicative of a trajectory of a turn of a vehicle, wherein the trajectory of the vehicle comprises an area between parallel tracks which project an area predicted to be occupied by the vehicle, and further wherein the one or more parameters indicative of the trajectory of the vehicle includes a radius of curvature of the trajectory; and
a processor arranged to set, in dependence on the one or more parameters including the radius of curvature of the trajectory, a first distance from a first edge of the trajectory for a boundary of a first alert zone and a second distance from a second edge of the trajectory for a boundary of a second alert zone, each alert zone of the first alert zone and the second alert zone being located beyond the extremities of the area predicted to be occupied by the vehicle, such that a size of the alert zone beyond the extremities of the area predicted to be occupied by the vehicle is dynamically adapted by continually increasing the distance of both alert zones in dependence on the radius of curvature of the trajectory continually decreasing, the distance of the alert zone on the outside of the turn increasing by more than the increase in the distance of the alert zone on the inside of the turn, where the boundary of the alert zone is, in use, determinative of a minimum distance from the trajectory below which a detected object will trigger an alert, and wherein the boundary of one or both of the first alert zone and the second alert zone is parallel to the trajectory.

2. The controller according to claim 1, further comprising an output arranged to output an alert signal in dependence on a determination that the vehicle reaches a position along the trajectory at a predefined distance from a point on the trajectory associated with a detected position of the object within the boundary of the first alert zone or the boundary of the second alert zone.

3. The controller according to claim 2, wherein the processor is configured to determine the point on the trajectory associated with a given detected position of the object similarly for all detected objects within the boundary of the first alert zone or the boundary of the second alert zone.

4. The controller according to claim 1, wherein the processor is arranged to determine the distance for the boundary of the first alert zone such that a different distance is determined for at least two different vehicle trajectories.

5. The controller according to claim 1, wherein the one or more parameters indicative of the trajectory of the vehicle comprise a parameter or parameters indicative of an operational state of a vehicle trajectory control interface.

6. The controller according to claim 1, wherein the processor is arranged to set the distance for the boundary of the first alert zone in dependence on a rate of change of the trajectory of the vehicle.

7. The controller according to claim 1, wherein the processor is arranged to increase the distance for at least part of the vehicle where the one or more parameters indicative of the trajectory of the vehicle indicate increased deviation from a particular predefined trajectory.

8. The controller according to claim 1, wherein the processor is arranged to increase the distance for at least part of the vehicle where the one or more parameters indicative of the trajectory of the vehicle indicate a decrease in radius of curvature of a turn.

9. The controller according to claim 1, wherein the processor is arranged to determine different distances at different locations around the vehicle for a given parameter or parameters indicative of the trajectory of the vehicle.

10. The controller according to claim 1, wherein the processor is arranged to determine the distance with respect to a nominal distance.

11. The controller according to claim 1, wherein the processor is arranged so that a distance adjustment it makes in accordance with an adjustment to the trajectory as indicated by the one or more parameters is reversed in accordance with an equal and opposite adjustment to the trajectory as indicated by the one or more parameters.

12. A system comprising a proximity sensor and the controller according to claim 1.

13. A vehicle comprising the controller according to claim 1.

14. A method of setting a distance for a boundary of an alert zone from a trajectory of a turn of a vehicle, the method comprising:

receiving a trajectory parameter signal comprising one or more parameters indicative of the trajectory of the vehicle, wherein the trajectory of the vehicle comprises an area between parallel tracks which project an area predicted to be occupied by the vehicle, and further wherein the one or more parameters indicative of the trajectory of the vehicle includes a radius of curvature of the trajectory; and setting, in dependence on the one or more parameters including the radius of curvature of the trajectory, a first distance from a first edge of the trajectory for a boundary of a first alert zone and a second distance from a second edge of the trajectory for a boundary of a second alert zone, each alert zone of the first alert zone and the second alert zone being located beyond the extremities of the area predicted to be occupied by the vehicle, such that a size of the alert zone beyond the extremities of the area predicted to be occupied by the vehicle is dynamically adapted by continually increasing the distance of both alert zones in dependence on the radius of curvature of the trajectory continually decreasing, the distance of the alert zone on the outside of the turn increasing by more than the increase in the distance of the alert zone on the inside of the turn, where the boundary of the alert zones is, in use, determinative of a minimum distance from the trajectory below which a detected object will trigger an alert, and wherein the boundary of one or both of the first alert zone and the second alert zone is parallel to the trajectory.

15. A non-transitory computer readable storage medium comprising computer readable instructions that, when executed by a processor, causes performance of the method of claim 14.

* * * * *